April 21, 1964     E. M. MOUNT, JR     3,130,353
ELECTRIC POWER SWITCHGEAR

Filed Dec. 4, 1961     3 Sheets-Sheet 2

INVENTOR:
ELDRIDGE M. MOUNT, JR.,
BY Albert S. Richardson Jr.
ATTORNEY.

April 21, 1964  E. M. MOUNT, JR  3,130,353
ELECTRIC POWER SWITCHGEAR
Filed Dec. 4, 1961  3 Sheets-Sheet 3

INVENTOR:
ELDRIDGE M. MOUNT, JR.,
BY Albert S. Richardson Jr.
ATTORNEY.

United States Patent Office 3,130,353
Patented Apr. 21, 1964

3,130,353
ELECTRIC POWER SWITCHGEAR
Eldridge M. Mount, Jr., Springfield, Pa., assignor to General Electric Company, a corporation of New York
Filed Dec. 4, 1961, Ser. No. 156,754
11 Claims. (Cl. 317—103)

This invention relates generally to electric power switchgear, and more particularly it relates to an arrangement of interconnected electric-current conducting members in metal-enclosed equipment of the kind used for controlling the distribution of electric power from a given source of supply to a plurality of individual feeders or load circuits.

In the art of electric power distribution, it is a general practice to dispose circuit components associated therewith inside a multi-unit, grounded sheet-metal enclosure. This apparatus, sometimes known as "switchgear," provides in one integral "package" the requisite means for both controlling and protecting a plurality of feeders or utilization circuits which are supplied from a common source of electric power. In low voltage switchgear (e.g., 600 volts A.-C.) of the kind often used in industrial power systems or the like, each unit of the enclosure will commonly include more than one circuit controlling device, and the various devices so provided are appropriately interconnected with the supply source via bare conducting members or buses mounted on insulating supports in a "buswork" section of the equipment.

In order to ensure reliable performance of such equipment, the user should regularly carry out routine maintenance and servicing procedures which are suggested by the switchgear manufacturer. Extraordinary maintenance and repair work may be needed in the event a short circuit or fault condition develops in the equipment. In either case, minimization of trouble and expense to the user depends upon keeping to a minimum both the extent of the work required and the length of time during which the equipment (or some parts thereof) must be out of service or shut down for such purposes. Accordingly, therefore, a general object of the present invention is to provide improved switchgear equipment wherein both planned and emergency maintenance and repair work can be minimized.

Another object of my invention is the provision of switchgear equipment having a buswork section so arranged that both the frequency and the extent of routine maintenance procedures in this part of the equipment are substantially reduced.

Still another object of the invention is the provision of improved low voltage switchgear wherein the possibility of fault occurrence in the buswork section thereof is substantially reduced, and wherein damaging communication of a fault, once it occurs, is significantly impeded.

A further object of my invention is the provision of improved switchgear equipment which is unusually convenient and safe to install and then maintain.

My invention has for another general object the provision of improved switchgear equipment having an unusually high degree of flexibility and versatility with regard to the arrangements of unit and component combinations.

It is another object of the invention to provide a switchgear construction which facilitates progressive assembly of many units in a variety of different combinations.

Yet another object is the provision of a multi-unit switchgear equipment in which the respective units can be assembled in a variety of different combinations while still maintaining an integral electric power supply bus running through the entire assemblage.

In carrying out my invention in one form, a metal-enclosed switchgear unit which is designed to house a plurality of circuit interrupters at different elevations therein is provided with compartmentalizing barrier means for defining separate buswork and cable compartments. The cable compartment, which is of unit height, conveniently accommodates the terminations of a plurality of electric current conductors by means of which various load circuits brought into this compartment can respectively be connected to the circuit interrupters. The buswork compartment is traversed horizontally by electric power bus bars to which a plurality of electroconductive risers are respectively connected, and a different set of conducting members extending horizontally from the respective risers is provided for connection to each circuit interrupter. The conductors terminating in the cable compartment are sheathed in insulating material where they pass through the buswork compartment.

I orient the lateral surfaces of the aforesaid bus bars vertically in order to minimize the amount of horizontal area exposed, whereby dust contamination of the conducting surfaces is less likely, and the possibility of introducing foreign objects into the buswork compartment is reduced. The above-mentioned barrier means will also contribute to these beneficial results. In addition the barrier means serves to protect a person working in the cable compartment from accidental contact with energized parts in the buswork compartment, and if a bus fault should occur it will be effectively isolated and contained. I respectively interconnect the associated bus bars, risers and conducting members in the buswork compartment by means of welding, whereby electrical joints having high integrity and requiring little maintenance are obtained.

In one aspect of my invention, a plurality of units of construction similar to that summarized above are contiguously disposed in side-by-side alignment with one another. The bus bars in the buswork compartment of each of these units are made no longer than unit width, and corresponding bus bars in mutually adjoining units of the alignment are electrically interconnected by means of welding. This arrangement makes it a relatively simple and inexpensive matter to build switchgear equipment comprising a variety of units assembled in a large number of alternative combinations.

My invention will be better understood and its various objects and advantages will be more fully appreciated from the following description taken in conjunction with the accompanying drawings in which.

Figure 4:
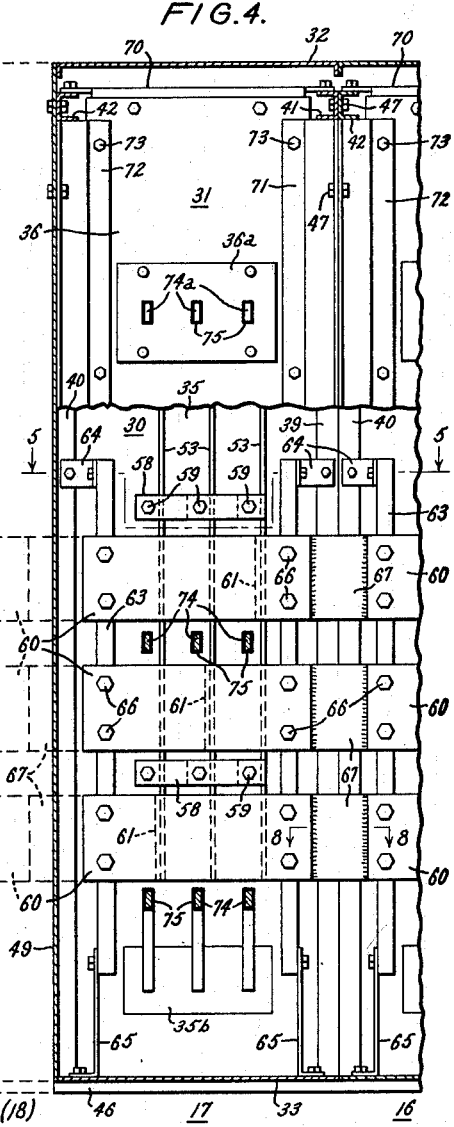
FIG. 4 is a sectional view along lines 4—4 of FIG. 3.
Figure 8:
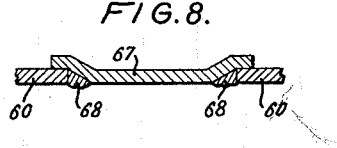
Figure 3:
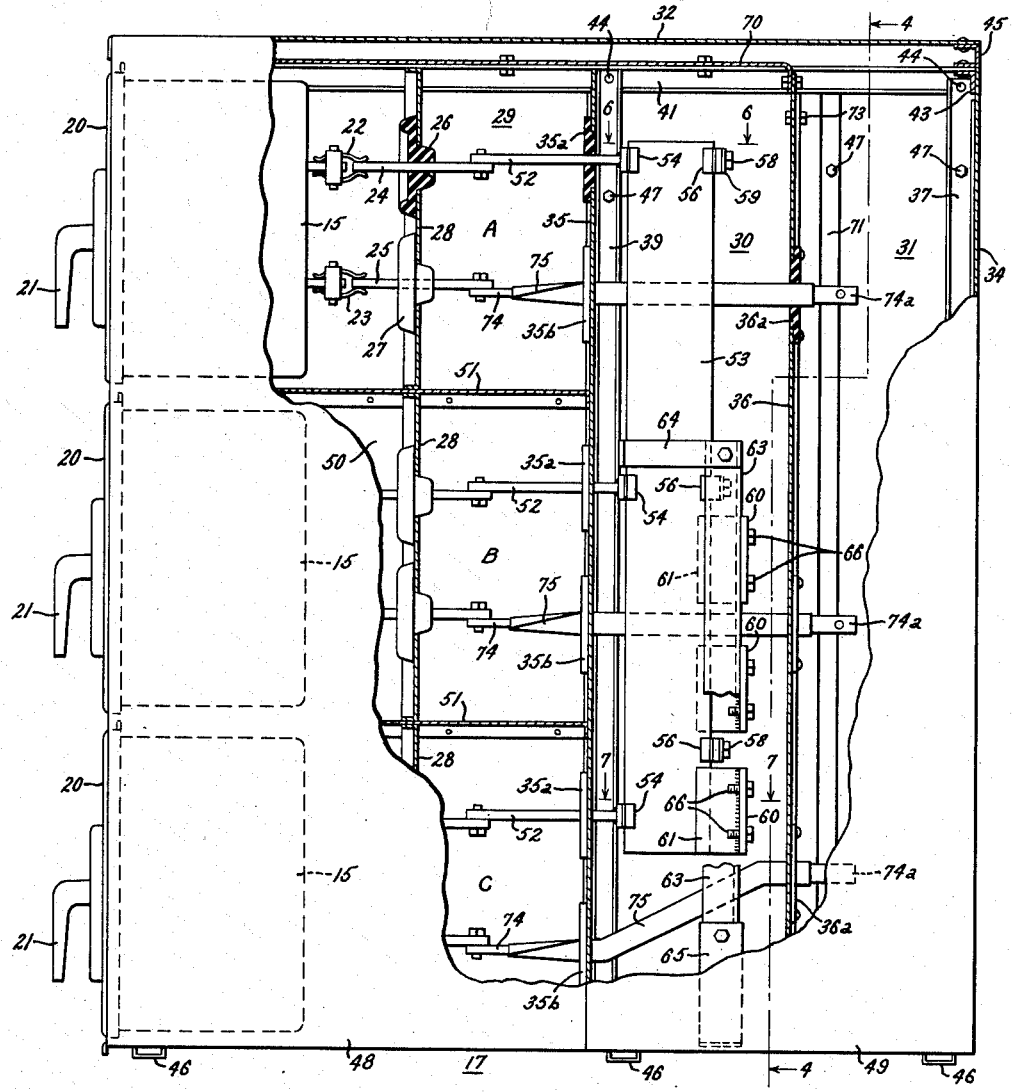
FIG. 3 is an enlarged end view, partly broken away, of the equipment of FIG. 2.
Figure 6:
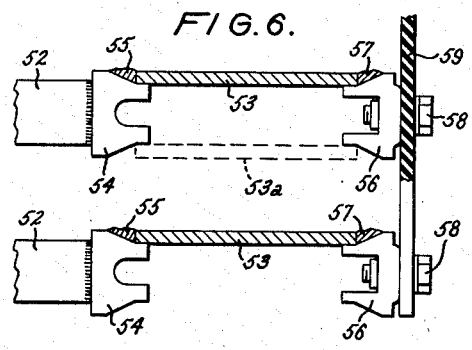
Figure 7:
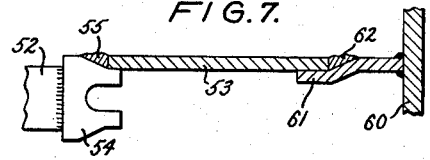

FIGS. 6 and 7 are enlarged sectional views along lines 6—6 and 7—7, respectively, of FIG. 3; and FIG. 8 is an enlarged sectional view along line 8—8 of FIG. 4.

Figure 1:
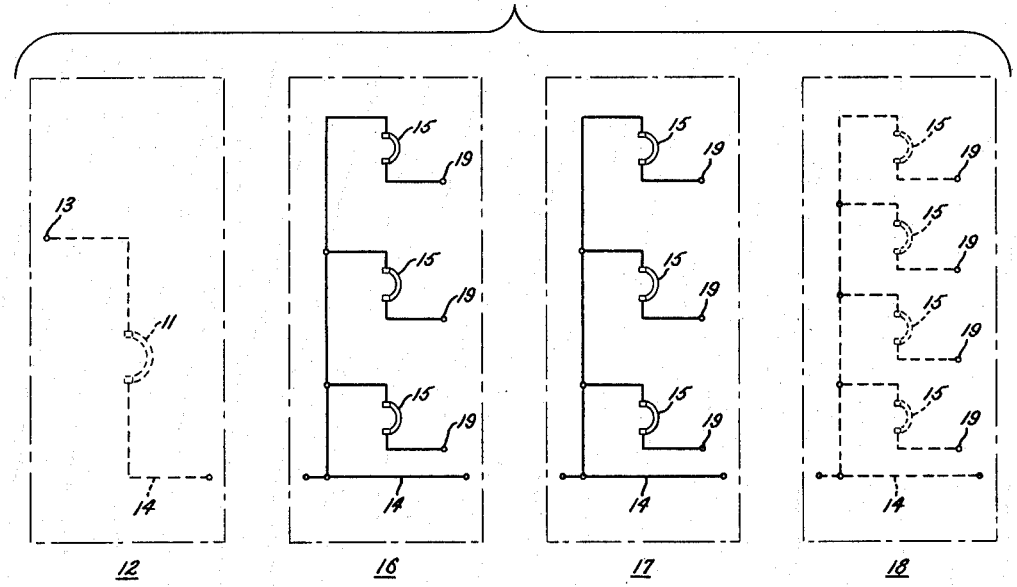
FIG. 1 is a one-line schematic representation of electric power switchgear embodying my invention.

Referring now to FIG. 1, I have shown in schematic form a plurality of coordinated units which will provide, upon interconnection thereof, a composite equipment for the distribution of electric power to a plurality of individual load circuits. This equipment includes a main circuit interrupter or breaker, illustrated symbolically at 11, which is located in an incoming line unit 12. The input 13 to the main breaker 11 is derived from any suitable source of electric energy. Where the voltage rating of the source is higher than that of the load circuits to be energized thereby, it is customary to employ a step-down transformer (not shown) which may be physically located immediately adjacent to the incoming line unit 12. While only one pole of the breaker 11 and one line of the electric circuits connected thereto have been indicated in FIG. 1, those skilled in the art will realize that this simplified showing is meant to represent a conventional polyphase, multi-wire A.-C. electric power distribution system.

Electric energy supplied by the polyphase source flows through the main circuit breaker 11 to an electric power bus 14 which is tapped by a plurality of individual circuit controlling devices 15 located in a plurality of feeder units 16, 17 and 18. The various sections of the bus 14 shown in the respective units in FIG. 1 would be electrically interconnected for this purpose. The outputs 19 of the respective devices 15, which are shown as circuit breakers in the illustrated embodiment of my invention, are adapted to be connected to a plurality of different load or utilization circuits (not shown) of the electric power system. The feeder units 16—18 are representative of a large variety of different units which might be associated in one composite equipment; the various units might differ from one another in matters such as the numbers, sizes and kinds of circuit breakers included therein, the current ratings of the respective feeders, and the arrangement of associated meters, instruments or other such components, if any.

The physical construction of the apparatus shown schematically in FIG. 1 will now be described with reference to the remaining figures of the drawings. Since a full appreciation of my invention can be gained from considering the structural details of the two feeder units 16 and 17 alone, just these typical units are shown in full. It should be clearly understood, however, that what is described in detail below is representative of but one specific embodiment of my invention; in actual practice the number and intermixture of units furnished, as well as the multiple combinations of breakers disposed in each of the respective units of a given installation, will vary widely according to the size and nature of the particular system which such distribution equipment is designed to control and protect. It will become apparent hereinafter that my invention enhances the ease and economy of realizing such permutations.

Figure 2:
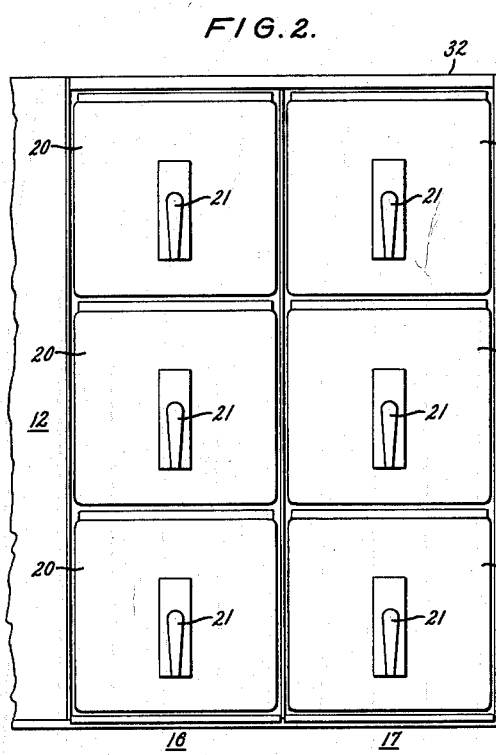
FIG. 2 is a front view of switchgear equipment such as that shown schematically in FIG. 1.

Referring now to FIG. 2, a front view of the feeder units 16 and 17 reveals that these two upstanding units or cabinets are contiguously disposed in side-by-side alignment with each other. Each unit is equipped for housing three of the circuit breakers 15 at different elevations therein, with the breakers being individually received in separate compartments or cubicles having sheet-metal front access panels 20. Each panel 20 has an opening through which the front escutcheon and manual operating handle 21 of the circuit breaker 15 located behind that panel protrudes, whereby a person standing in front of the illustrated equipment can operate the respective breakers at will.

The circuit breakers 15 have been shown in block form in FIG. 3, which is an end view (partly broken away) of the unit 17. Each breaker is a 3-pole device suitable for closing and interrupting an electrically energized 3-wire circuit. The details of the contact structure and operating mechanism of such a device are not relevant to an understanding of the present invention and are omitted in the drawings. I intend the illustrated circuit breakers 15 to represent many different species of circuit interrupting device commonly housed in metal enclosures for purposes of electric power distribution.

Each of the units 16 and 17 is adapted to support its three circuit breakers 15 either in a stationary or a readily removable fashion. As illustrated in FIG. 3, a removable or "drawout" supporting arrangement is contemplated in the preferred embodiment of my invention, and toward this end each pole of the circuit breaker 15 is provided with a pair of spring-loaded primary disconnect members 22 and 23. These members are aligned, respectively, with stationary primary disconnect members 24 and 25 mounted in insulating bushings 26 and 27 which are supported between the sides of the unit by a vertical metal plate 28. In each of the breaker compartments (identified respectively as A, B and C in FIG. 3), the cooperating disconnect members 22, 24 and 23, 25 are interengaged whenever the circuit breaker 15 is fully inserted therein, while they are separated and hence disconnected upon withdrawing the breaker from its operating position. Any suitable means can be used for guiding and moving the breaker into and out of the compartment which receives it; for example, each breaker compartment might be provided with a telescopic inner part constructed and arranged in the manner which Philip C. Netzel has disclosed and claimed in his copending patent application S.N. 154,960 filed on November 27, 1961, assigned to the assignee of the present application.

As is customary in the art, the tiered breaker compartments A, B and C are located in a front section 29 of the upstanding units 16 and 17, respectively. Behind each front section 29 is a buswork compartment or section 30, and behind that, in accordance with the present invention, a cable compartment or section 31 is located. As is best seen in FIGS. 3 and 4, the whole unit (unit 17 being typical) is clad at top and bottom in horizontal metal plates 32 and 33, respectively, while a vertical sheet-metal panel 34 at the unit's back is disposed in a plane parallel to the front access panels 20. In between its front and rear panels, and disposed in parallel relationship thereto, each unit includes spaced, full-height barrier means 35 and 36 which divide it interiorly into the three sections 29, 30 and 31 mentioned above. Thus the middle or buswork section 30 of the unit is separated from the front section 29 by the barrier means 35 and is separated from the rear or cable section 31 by the barrier means 36.

The several exterior walls 32–34 of each unit are fastened to a rigid, generally rectangular frame which includes a pair of corner posts 37 and 38, a pair of upright channels 39 and 40, a pair of horizontal side channels 41 and 42, and a horizontally extending rear angle 43, all interconnected at their respective intersections by means of rivets 44 or the like. The top plate 32 is spaced above the channels 41 and 42 by means of structural members 45, one of which is shown in FIG. 3. The bottom plate 33 of the unit rests on a footing comprising the supporting members 46 shown in FIGS. 3 and 4. Each unit is thus a "free standing" structure.

The two mutually adjoining units 16 and 17 are structurally connected by means of bolts 47 or the like which respectively fasten the corner post 37, the upright channel 39 and the side channel 41 of unit 17 to the corresponding, contiguously disposed members 38, 40 and 42 of the unit 16. The outlying sides of the respective units are physically closed by means of metal closures which are located at opposite ends of the integral unit alignment. Thus the right side of unit 17 (front view) is provided with a vertical wall comprising metal side sheets 48 and 49, while the left side of unit 16 is closed by the incoming line unit 12 located adjacent thereto. If another upstanding feeder unit 18 (FIG. 1) were added to the alignment illustrated in FIGS. 2–4, it would be disposed beside unit 17 and side sheet 49 would be transferred to the outlying side of this additional unit.

Figure 5:
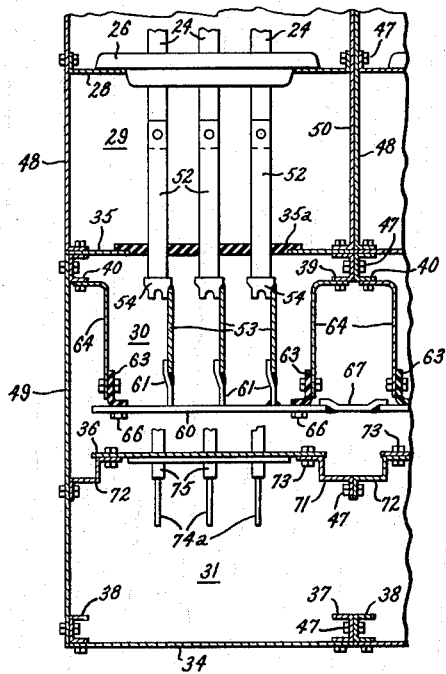
FIG. 5 is a sectional view along lines 5—5 of FIG. 4.

The front section 29 of each unit is laterally bounded on one side by the sheet 48 and on the opposite side by a companion side sheet 50. As is shown in FIG. 5, the vertical plate 28 of each breaker compartment is suspended between the side sheets, and bolts 47 or the like are used to structurally interconnect the contiguous sheets 50 and 48 of units 17 and 16, respectively. The side sheets 50 and 48 which bound each front section 29 are inwardly flanged at their rear edges where they are attached, together with the vertical isolating barrier 35 (which is the barrier means referred to above), to the upright channels 39 and 40 of the unit frame by suitable fastening means. In FIG. 3 it is apparent that the respective breaker compartments A, B and C in the front section of each unit are separated from each other by horizontal metal plates 51 which are anchored to the side sheets 48 and 50 and to the vertical barrier 35.

Located in the buswork section 30 of each unit, and extending frontwardly therefrom, are a plurality of sets of horizontally supported conducting members 52. As best seen in FIG. 5, each of these sets comprises three parallel members 52 which extend through a rectangular insert 35a of insulating material in the metal barrier 35 and thence into the front section 29 of the unit where their terminations are bolted, respectively, to the upper stationary disconnect members 24 associated with the three different poles of a circuit breaker 15. As is best seen in FIG. 3, a unit includes three such sets of members 52, one set per circuit breaker compartment, and the three sets pass through the vertical barrier 35 at different elevations thereof. The conducting members 52 are preferably aluminum.

Also disposed in the buswork section 30 are three electroconductive risers 53 comprising flat bars of aluminum which are supported vertically with their lateral surfaces in spaced relation between and parallel to the unit sides. As can be seen in FIGS. 3 and 5, the three conducting members 52 of each of the above-mentioned sets are respectively welded to the three different risers 53. Thus the respective sets of members 52 are connected, at different elevations, to the common risers 53. FIG. 6 reveals the preferred manner in which these welded connections are formed.

As shown in FIG. 6, the base of a U-shaped connector 54, preferably made from extruded aluminum stock, is welded to the end of each member 52. A riser 53 overlaps one leg of each connector 54 to which it is welded as shown at 55. This welded connection can be expeditiously made by means of a welding gun utilizing the known filler arc welding process. The weld 55 is built up from a consumable aluminum electrode. The broken-line bar 53a in FIG. 6 shows the connector 54 to be well suited for connecting each member 52 to two electrically parallel risers if desired.

FIG. 6 also illustrates the manner in which the spacings between parallel risers 53 are maintained. Another U-shaped connector 56, similar to connector 54, is welded at 57 to the rear edge of each riser 53, and the base of the connector 56 is suitably arranged to receive a bolt 58. A bracing rod 59 of insulating material is securely fastened by the bolts 58 to the adjacent connectors 56, whereby the respective risers 53 are rigidly held in their flatwise spaced relation against strong magnetic forces acting laterally thereon. As can be seen in FIGS. 3 and 4, a total of three such bracing members 59 are provided at different elevations of the risers 53.

The buswork section 30 of each switchgear unit additionally includes three electric power bus bars 60. These bus bars as illustrated in FIGS. 3–5 are elongated, flat members (preferably aluminum) which horizontally traverse the unit, at different elevations thereof, in a common vertical plane adjacent to the rear of the buswork compartment. The lateral surfaces of the respective bus bars are oriented vertically as shown. The three parallel bars 60 are respectively adapted to be connected for energization to different phases of a 3-phase A.-C. electric power supply source, and they comprise the main bus conductors of the switchgear assembly which in FIG. 1 were represented schematically by the bus 14.

The three bus bars 60 are connected, respectively, to the three risers 53 located in the same unit. For this purpose, three splice plates 61 are employed. As is best seen in FIG. 7, one end of the splice plate 61 is butt welded to a bus bar 60, while the other end overlaps a riser 53 to which it is welded at 62, again using the filler arc welding process. In this manner the lower bus bar 60 is welded to the left-hand riser 53 (as viewed in FIG. 4), the middle bus bar 60 is welded to the middle riser 53, and the upper bus bar 60 is welded to the right-hand riser 53.

In order to support the horizontally extending bus bars 60 within each bus work section 30, a pair of supporting angles 63 of insulating material are vertically disposed near opposite sides of the unit. As is clearly shown in FIGS. 3–5, each supporting angle 63 is rigidly suspended between an upper bracket 64 which is affixed to the upright channel 39 or 40 and a lower bracket 65 which is affixed to the bottom plate 33 of the unit. The respective bus bars 60 are secured, in edgewise spaced relationship, to both bus supports 63 by means of bolts 66. It should be noted that my above-described disposition of bus bars 60 minimizes the depth dimension of the buswork section 30, and at the same time it lends itself to the addition of current-carrying capacity without requiring additional space. Double bus bars can conveniently be utilized at the location of each bar 60, and still other bars, if needed, can be mounted for traversing the unit at elevations above the three bars shown.

While each bus bar 60 extends from one side to the other side of the unit in which it is located, its length is no greater than the width of that unit. Corresponding bus bars of the companion units 16 and 17 are integrally joined by means of welding. As is best seen in FIGS. 4, 5 and 8, the welded junction between interconnected bus bars located in these mutually adjoining units is formed with the aid of a relatively short splice member 67 which overlaps adjacent ends of the bus bars and is welded respectively thereto by filler arc welds 68.

If another upstanding feeder unit 18 (FIG. 1) were positioned beside the unit 17, it would be electrically connected to both of the illustrated units 16 and 17 by means of its bus bars 60 and additional splice members 67 welded thereto, as indicated by the broken-line showing in FIG. 4. In the buswork section of the unit 16, the bus bars 60 are welded by means of similar splice members to correspondingly positioned bus bars (not shown) located in the incoming line unit 12. It is apparent, therefore, that all units in the alignment are electrically interconnected by these welded junctions formed between the adjacent ends of the corresponding bus bars 60. Since all of the necessary interconnections between conducting parts in each buswork section 30 are made by welded joints, they will not loosen under varying load conditions, and consequently there is no need to tighten such connections during periodic maintenance.

In accordance with my invention, each of the upstanding switchgear units is so constructed that the vertical plane in which its three bus bars 60 are disposed is located at the same depth of the alignment. Accordingly, these vertical planes of the respective units are all coplanar. This makes it a relatively simple and inexpensive matter to assemble a wide variety of different units in various different combinations; the electrical connection between mutually adjoining units always being made by means of the short splice members 67 described above.

The barrier means 36 which separates the buswork section 30 from the cable section 31 of each unit comprises a flat metal plate bolted at its top to a flange of a horizontal plate 70 spanning the side channels 41 and 42 of the unit. The plate 36 is connected near its vertical edges to a pair of vertical, full-height corner troughs 71 and 72, respectively, by means of bolts 73 or the like. Corresponding lateral flanges of the trough 71 in unit 17 and of the trough 72 in unit 16 are bolted together, as is shown in FIGS. 4 and 5.

It is apparent that parts 36, 71 and 72 form a compartmentalizing barrier which isolates the buswork section 30 from the cable section 31 in each unit. With this arrangement a person can work safely in the cable section 31 without danger of accidentally touching energized or "live" members in the adjacent buswork section and without being directly exposed to fault hazards in the event a malfunction should occur in that part of the equipment. If desired, isolation between the respective cable sections of adjoining units can be conveniently provided by installing a vertical barrier (not shown) along the unit boundary between the corner posts 37, 38 and the troughs 71, 72.

As is best seen in FIG. 3, a plurality of sets of horizonally disposed elongated conductors 74 extend from the front section 29 of each unit, through the buswork section 30 and into the cable section 31 where the respective conductors have terminations 74a adapted for bolted connection to electric load circuits. As indicated in FIGS. 4 and 5, each of these sets comprises three parallel members 74. They run through a rectangular insert 35b of insulating material in the metal barrier 35 and then pass through a rectangular insert 36a of flame retardant insulating material in the metal barrier 36. The forward terminations of the conductors 74 of each set are bolted, respectively, to the lower stationary disconnect members 25 associated with the three different poles of a circuit breaker 15. As is best seen in FIGS. 3 and 4, a unit includes three such sets of conductors 74, one set per circuit breaker.

Each of the conductors 74 is sheathed in a polyvinyl insulating sleeve 75 where it spans the buswork section 30 of the unit. In this manner the respective load circuits or feeders are electrically isolated from the bus bars 60, the risers 53 and the conducting members 52 which are located in the buswork section 30, and as a result, communication of bus faults to the feeder circuits is effectively impeded. The conductor terminations 74a in the cable section 31 of each unit are conveniently accessible for the connection thereto of outgoing feeder cables or the like.

While a preferred form of the invention has been shown and described by way of illustration, many modifications will occur to those skilled in the art. I therefore contemplate by the claims which conclude this specification to cover all such modifications as fall within the true spirit and scope of my invention.

What I claim as new and desire to secure by United States Letters Patent is:

1. Electric power switchgear equipment comprising:
   (a) a plurality of upstanding, generally rectangular metal-clad units disposed, respectively, in side-by-side alignment with one another;
   (b) means structurally connecting the mutually adjoining units of said alignment;
   (c) means physically closing the outlying sides of the units situated at opposite ends of said alignment;
   (d) each of said upstanding units being interiorly divided by vertical barrier means into two separate sections, with one of the two sections being located in front of the other;
   (e) means disposed within the front section of each of said units for receiving an electric circuit interrupter, with a plurality of such receiving means being located at different elevations in the front section in at least one of said units;
   (f) a plurality of parallel conducting members supported in each of said units, each of said members extending horizontally through the vertical barrier means and having within the front section of the associated unit a termination adapted to be connected to a circuit interrupter, at least two such members being provided per circuit-interrupter-receiving means in each unit;
   (g) at least two electroconductive risers supported vertically within said other section of each of the upstanding units, said risers being welded, respectively, to the conducting members which are associated with each receiving means located in the same unit;
   (h) at least two parallel electric power bus bars supported within said other section of each of said units and extending from one side to the other side of the unit, with the length of each of said bus bars being no greater than the width of the unit in which it is located, said bus bars being disposed in a common vertical plane and being welded, respectively, to the electroconductive risers which are located in the same unit; and
   (i) means for electrically interconnecting all of the upstanding units in said alignment, comprising a plurality of welded junctions formed, respectively, between adjacent ends of the corresponding bus bars located in all mutually adjoining units of said alignment.

2. In metal-enclosed electric power switchgear apparatus:
   (a) a plurality of upstanding, generally rectangular metal-walled units disposed, respectively, in side-by-side alignment with one another;
   (b) means structurally connecting the mutually adjoining units of said alignment;
   (c) metal closures at opposite ends of said alignment of units;
   (d) each of said units including barrier means disposed vertically therein to define first and second sections which are separated by the barrier means, the second section being located behind said first section;
   (e) the first section of each of said units being adapted to support, at different elevations therein, a plurality of 3-pole circuit interrupters;
   (f) each of said units having supported therein a plurality of sets of three parallel conducting members, said sets extending frontwardly from the second section of the unit through the barrier means into the first section at different elevations thereof for connection, respectively, to the circuit interrupters which said first section is adapted to support, with the members of each of said sets being respectively disposed for connection to different circuit interrupter poles;
   (g) each of said units having supported in the second section thereof three electroconductive risers to which are connected, at different elevations, the respective sets of conducting members supported in the same unit, with the three members of each of said sets being respectively connected to the three risers;
   (h) each of said units having supported in the second section thereof three main bus conductors extending horizontally from one side of the unit to the other side thereof, with the length of each bus conductor being no greater than the width of the associated unit, said bus conductors being welded, respectively, to the risers which are supported in the same unit; and
   (i) all of the units in said alignment being electrically interconnected by means of said main bus conductors, with the corresponding bus conductors in mutually adjoining units of said alignment being integrally joined by means of welding.

3. In metal-enclosed electric power switchgear apparatus, two upstanding switchgear units contiguously disposed in side-by-side relation to each other, each of said units comprising:
   (a) front and rear sheet-metal panels disposed in parallel vertical planes;
   (b) at least two electric circuit breaker compartments located at different elevations behind the front panels;
   (c) a buswork compartment located behind the breaker compartments;
   (d) a plurality of electric power supply bus bars supported horizontally in the buswork compartment and extending from one side to the other side thereof, with the length of each of said bus bars being no greater than the width of the buswork compartment;

(e) a plurality of electroconductive risers supported vertically in the buswork compartment and welded, respectively, to said bus bars;
(f) at least two sets of conducting members welded to said risers at different elevations and extending frontwardly therefrom into the respective breaker compartments; and
(g) the contiguous switchgear units being electrically interconnected by means of said bus bars, with corresponding bus bars in the respective units being integrally joined by means of welding.

4. Electric power switchgear equipment comprising:
(a) a generally rectangular metal-clad unit having its interior divided by vertical barrier means into three separate sections, with the three sections being respectively located in front, middle and rear of the unit;
(b) the front section of said unit being adapted to support, at different elevations therein, a plurality of electric circuit interrupters;
(c) a plurality of sets of parallel conducting members supported in the middle section of said unit and extending frontwardly therefrom into said front section at different elevations thereof, each of said members having within the front section a termination adapted to be connected to a circuit interrupter, with a different set of said members being provided for each of the circuit interrupters which the front section is adapted to support;
(d) at least two electroconductive risers supported vertically within the middle section of said unit, said risers being connected, respectively, to the members of each of said sets of conducting members;
(e) at least two parallel electric power bus bars horizontally traversing the middle section of said unit and connected to said risers, respectively; and
(f) a plurality of sets of elongated conductors extending from the front section through the middle section and into the rear section of said unit, each of said conductors having within the front section a termination adapted to be connected to a circuit interrupter, with a different set of said conductors being provided for each of the circuit interrupters which the front section is adapted to support, and each of said conductors being insulated where it spans said middle section and having a termination within said rear section for connection to an electric load circuit.

5. The electric power switchgear equipment of claim 4 in which the connections made within the middle section of the unit between the electroconductive risers and the respective conducting members, as well as those between the risers and the respective electric power bus bars, comprise welded junctions.

6. A compartmentalized metal-enclosed electric power switch gear unit comprising:
(a) front and rear upstanding sheet-metal panels;
(b) at least two electric circuit breaker compartments located at different elevations behind the front panels;
(c) a cable compartment located in front of the rear panel, the cable compartment height being equal to the cumulative heights of said breaker compartments;
(d) a buswork compartment located in between the cable compartment and the breaker compartments with the buswork and cable compartments being separated by a compartmentalizing barrier disposed therebetween;
(e) a plurality of electric power supply bus bars horizontally traversing the buswork compartment in a generally vertical plane adjacent to its rear;
(f) a plurality of electroconductive risers supported vertically in the buswork compartment in front of said vertical plane, said risers being respectively connected to said bus bars;
(g) at least two sets of conducting members connected to the risers at different elevations and extending frontwardly therefrom into the respective breaker compartments; and
(h) a plurality of insulated conductors extending rearwardly from the respective breaker compartments through said buswork compartment and through said compartmentalizing barrier into said cable compartment, said conductors having terminations in said cable compartment adapted for connection to electric load circuits.

7. Electric power switchgear comprising:
(a) a plurality of upstanding metal-walled units disposed in side-by-side alignment with one another;
(b) means structurally connecting the mutually adjoining units of said alignment;
(c) means physically closing the outlying sides of the units situated at opposite ends of said alignment;
(d) vertical barrier means disposed in each of said units for interiorly dividing the unit into first and second sections, the first section being located in front of the second section;
(e) means disposed within the first section of each of said units for receiving an electric circuit interrupter, with a plurality of such receiving means being located at different elevations of the first section in at least one of said units;
(f) a plurality of conducting members disposed in the second section of each of said units, each of said members extending horizontally through said barrier means into the first section of the associated unit where it is adapted to be connected to a circuit interrupter, at least two such members being provided per circuit-interrupter-receiving means in each unit;
(g) at least two electroconductive risers supported vertically within the second section of each of said units, said risers being welded, respectively, to the conducting members which are associated with each receiving means located in the same unit;
(h) at least two flat bus bars supported within the second section of each of said units and traversing the unit from one side to the other with their lateral surfaces oriented vertically, the length of each of said bus bars being no greater than the width of the unit in which it is located, said bus bars being welded, respectively, to the electroconductive risers which are located in the same unit;
(i) means for electrically interconnecting all of the units in said alignment, comprising a plurality of welded junctions formed, respectively, between adjacent ends of the corresponding bus bars located in all mutually adjoining units of said alignment;
(j) said interconnected bus bars being adapted to be energized from a source of electric power; and
(k) means adapted to interconnect a circuit interrupter and an electric load circuit associated with each of said plurality of receiving means which are located in the first section in at least one of said units.

8. The electric power switchgear of claim 7 in which the flat bus bars supported within the second section of each unit are disposed in a common vertical plane.

9. Electric power switchgear equipment comprising:
(a) a plurality of upstanding metal-walled units disposed in side-by-side alignment with one another;
(b) means structurally connecting the mutually adjoining units of said alignment;
(c) means physically closing the outlying sides of the units situated at opposite ends of said alignment;
(d) a vertical barrier disposed in each of said units for interiorly dividing the unit into first and second sections;
(e) means disposed within the first section of each of said units for receiving an electric circuit interrupter, with a pluraltiy of such receiving means being located at different elevations in the first section in at least one of said units;

(f) a plurality of electric power bus bars supported horizontally in the second section of each of said units and extending from one side to the other side thereof, with the length of each of said bus bars being no greater than the width of the unit in which it is located;

(g) a plurality of electroconductive risers supported vertically within the second section of each of the said units, said risers being connected, respectively, to the bus bars which are located in the same section;

(h) a plurality of conducting members supported horizontally in each of said units, each of said members extending from a riser in the second section, through said barrier and into the first section of the associated unit where it is adapted to be connected to a circuit interrupter, at least two such members per circuit-interrupter-receiving means being connected to different ones of said risers in each unit; and (i) means for electrically interconnecting all of the units in said alignment, comprising a plurality of welded junctions formed, respectively, between adjacent ends of the corresponding bus bars located in all mutually adjoining units of said alignment.

10. The electric power switchgear equipment of claim 9 in which an additional vertical barrier is disposed in each of said units for defining a third interior section of the unit, with each of said units having supported therein a plurality of insulated conductors extending from the first section, through the first-mentioned barrier, through the second section, through the additional barrier and into the third section of the associated unit, each of said conductors having within the first section a termination adapted to be connected to a circuit interrupter and having within the third section a termination adapted for connection to an electric load circuit, with at least two such conductors being provided per circuit-interrupter-receiving means in each unit.

11. In electric power switchgear:
(a) an upstanding metal unit;
(b) vertical barrier means disposed within said unit to define first, second and third interior sections thereof, with the third section being of unit height and being physically isolated by the barrier means from the first and second sections;
(c) circuit breaker supporting means disposed in said first section for accommodating at different elevations a plurality of electric circuit breakers, each of the circuit breakers having source and load terminals;
(d) at least two electric power bus bars horizontally traversing said second section;
(e) conducting means adapted to connect the source terminals of each of the circuit breakers accommodated by said supporting means to said bus bars, respectively; and,
(f) a plurality of sets of elongated conductors extending from said first section into said third section where the respective conductors are adapted to be connected to electric load circuits, each of said conductors having within said first section a termination adapted to be connected to the load terminals of a circuit breaker, with a different set of said conductors being provided for each of the circuit breakers accommodated by said supporting means.

References Cited in the file of this patent

UNITED STATES PATENTS 2,319,415     Lightfoot _____ May 18, 1943
2,606,233     Schymik _____ Aug. 5, 1952